(12) United States Patent
Morini

(10) Patent No.: US 9,386,795 B2
(45) Date of Patent: Jul. 12, 2016

(54) RECONSTITUTABLE AND WATER SOLUBLE CHIA PRODUCT AND RELATED METHOD OF MANUFACTURE

(71) Applicant: Angelo Morini, Windermere, FL (US)

(72) Inventor: Angelo Morini, Windermere, FL (US)

( * ) Notice: Subject to any disclaimer, the term of this patent is extended or adjusted under 35 U.S.C. 154(b) by 0 days.

(21) Appl. No.: 14/634,079

(22) Filed: Feb. 27, 2015

(65) Prior Publication Data

US 2015/0245646 A1    Sep. 3, 2015

Related U.S. Application Data

(60) Provisional application No. 61/946,239, filed on Feb. 28, 2014.

(51) Int. Cl.
| | |
|---|---|
| A23L 1/10 | (2006.01) |
| A23L 1/36 | (2006.01) |
| A23L 2/52 | (2006.01) |
| A23L 1/30 | (2006.01) |

(52) U.S. Cl.
CPC . *A23L 1/366* (2013.01); *A23L 1/30* (2013.01); *A23L 2/52* (2013.01)

(58) Field of Classification Search
CPC ......... A23L 1/0526; A23L 1/40; B02C 11/00; B02C 23/18; B02C 9/04
USPC .......... 426/557, 573, 629, 633, 641, 659, 660
See application file for complete search history.

(56) References Cited

U.S. PATENT DOCUMENTS

| | | | |
|---|---|---|---|
| 2010/0310719 A1* | 12/2010 | Finney et al. | 426/44 |
| 2012/0015093 A1 | 1/2012 | Finney et al. | |
| 2013/0136708 A1 | 5/2013 | Qu et al. | |

* cited by examiner

*Primary Examiner* — Michele L Jacobson
*Assistant Examiner* — Subbalakshmi Prakash
(74) *Attorney, Agent, or Firm* — Jason T. Daniel, Esq.; Daniel Law Offices, P.A.

(57) ABSTRACT

A method provides a reconstitutable and water soluble free flowing powder product that includes non-mucilaginous, non-oily free flowing chia grains having a size of between approximately 80 and 90 microns, a PH range of between 6.5 and 7.5, 3% average moisture, and a centipoise of between approximately 1,000 and 1,500 cp with 50% water solution.

17 Claims, 1 Drawing Sheet

Provide chia grains

Hydrate and agitate grains

Reduce particle size of hydrated grains

Adjust temperature of hydrated grains

Remove mucilaginous properties of the grains

Dry the non-mucilaginous grains to form dry flakes

Dry mill the flakes to form free flowing water soluble powder containing the grains.

Provide chia grains

Hydrate and agitate grains

Reduce particle size of hydrated grains

Adjust temperature of hydrated grains

Remove mucilaginous properties of the grains

Dry the non-mucilaginous grains to form dry flakes

Dry mill the flakes to form free flowing water soluble powder containing the grains.

RECONSTITUTABLE AND WATER SOLUBLE CHIA PRODUCT AND RELATED METHOD OF MANUFACTURE

CROSS-REFERENCE TO RELATED APPLICATIONS

This application claims the benefit of U.S. Application Ser. No. 61/946,239 filed on Feb. 28, 2014, the contents of which are incorporated herein by reference.

TECHNICAL FIELD

The present invention relates generally to grain and seed processing, and more particularly to a system and method for producing a water soluble Chia product.

BACKGROUND

Essential Fatty Acids are nutritional cornerstones of human health. One such fat includes Omega-3, which is deemed 'essential' for humans because it is needed for proper health. However, much like certain vitamins and minerals, humans are not able to produce this fatty acid on their own. As a result, it is important to ensure that a sufficient amount of Omega-3 is consumed through a balanced diet and/or through supplementation.

Although Omega-3's are most commonly associated with cardiovascular health, recent studies have shown that the two main omega-3 components eicosapentaenoic acid (EPA) and docosahexaenoic acid (DHA) can help lower triglycerides, body inflammation and blood pressure. Additional studies have shown that omega-3 fatty acids may also help with rheumatoid arthritis, depression, and other such conditions.

Salvia hispanica L, commonly known as chia, is a species of flowering plant in the mint family, and is high in Omega-3 fatty acids. Through extensive research and development, the inventor of the presently claimed invention has developed a new and commercially available cultivar of Salvia hispanica L called Anutra®. The Anutra® grain is FDA and USDA approved and was created without the aid of genetically modified organisms (Non-GMO) to generate the highest and safest natural source of Omega-3's, antioxidants, fiber, complete protein, and other important phyto-nutrients available on the market.

Although useful as a grain, chia seeds, such as Anutra® are not naturally water soluble. Although chia seeds can absorb up to 12 times their weight in liquid, the immersed chia seeds develop a mucilaginous gel-like coating that results in a distinctive and unpleasant texture that is "gritty" in nature. As such, attempts to introduce the beneficial effects of chia, and more specifically Anutra® directly into beverages, or to create a water soluble powder which can be added to a beverage as a supplement have been unsuccessful.

Various attempts have been made in the field of whole seed processing and controlled viscosity products. One such example includes U.S. Patent Publication No. 2012/0015093, the contents of which are incorporated herein by reference in its entirety for the disclosure.

Although the above noted disclosure is useful with respect to its stated objective, the above identified document does not disclose a system or method for producing a water soluble chia product, as described herein.

SUMMARY OF THE INVENTION

The present invention is directed to a reconstitutable and water soluble chia powder product and a method of manufacturing the same.

In one embodiment, the chia powder product includes non-oily free flowing grains having a size of between approximately 80 and 90 microns, a PH range of between 6.5 and 7.5, a 3% average moisture, and a centipoise of between approximately 1,000 and 1,500 cp. When the product is mixed with an aqueous carrier such as water, juice or other such beverages, the composition can revert to between 50 and 53 microns that is non-mucilaginous and water soluble.

In another embodiment, the method includes providing suitable chia grains, which are hydrated and reduced in size, the temperature and PH levels are adjusted and the mucilaginous properties are removed. The resulting product is dried and milled into a fine powder that is non-oily, free flowing, non-mucilaginous and water soluble.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 1 is a process flowchart for preparing a reconstitutable and water soluble chia powder product according to a current embodiment.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described throughout this document, the presently claimed invention contemplates the use of the commercially available cultivar of chia known as Anutra®. For ease of description, however, the terms Anutra and chia will be used interchangeably throughout this document. Moreover, although described with respect to chia, those of skill in the art will recognize that the inventive concepts disclosed herein can also be applied to other forms of grains and whole seeds such as flax, for example, in order to create a dry powder product that is water soluble.

Chia, in its natural state is a non-soluble dark brown grain that is very mucilaginous, has a high bacteria plate count, a bitter aftertaste, and has a centipoise (cp) range of between 150,000 and 200,000 when mixed with equal parts water. Through extensive research and study, the inventor of the present application has developed a novel method and system for transforming chia grain/seeds into a composition of matter which is a dry, reconstitutable powder that is water soluble.

The composition of the current embodiment can include a dry, reconstitutable powder of non-GMO chia grains having a size between approximately 80 and 90 microns that is loose and contains no oily residue. The PH range can be between 6.5 and 7.5 with 3% average moisture and a centipoise range of between 1,000 and 2,000 cp. When the composition is mixed with an aqueous carrier such as water, juice or other such beverages, the composition can revert to between 50 and 53 microns that is non-mucilaginous and water soluble.

One embodiment of a method for creating a reconstitutable and water soluble chia powder product can include the following steps, which are generally illustrated in the flowchart of FIG. 1. Other features of the current embodiments will become apparent in the course of the following descriptions, which are given for illustration of the current embodiments, and are not intended to be limiting thereof.

Step 1. Acquiring/producing suitable chia grains. In the preferred embodiment, suitable chia grains will include Anutra® whole grain chia having an average grain size of approximately 2 mm, however other forms, types and brands of chia are also contemplated. In either instance, the chia grains will preferably be clean and dry.

Step 2. Mixing and agitating the chia whole grains from step 1 with an aqueous carrier such as water for a specific amount of time, and at a specific ratio, temperature, and PH level.

In the preferred embodiment, the mixture ratio can include approximately 87.5% water and 12.5% chia grains; the temperature of the water can be approximately 175° F., which is maintained throughout the entirety of the step; the PH level of the water and grain can be adjusted in accordance with known mediums such as lemon juice or citric acid, for example, until a range of between 6.5-7.5 is obtained and maintained throughout this step. In another embodiment, additional ingredients such as vitamin C, vitamin A, tocopherols, beta carotene, and other antioxidants can be added to the mixture at a preferred dosage of 750 parts per million. The addition of these substance can function to increase the health benefits of the resulting product. The mixing process can occur in a steel tank or other suitable vessel wherein moderate mechanical agitation can be applied for approximately 2 hours before draining. The agitation can be performed manually or mechanically utilizing any number of commercially available agitation devices.

After the agitation process has completed, the resulting hydrated chia grains will include an average size of between 2.5 mm and 4 mm, having a temperature of 175° F. and a centipoise of between 10,000 and 25,000 cp based on 50% water solution.

At step 3, the hydrated chia grains from step 2 can be transferred to an industrial mixer which can reduce the particle size of each grain. In the preferred embodiment, the industrial mixer can include a rotor/stator workhead operating at 10,000 RPM for 90 minutes so as to reduce the particle size of each chia grain to approximately 140 microns, while maintaining a temperature of approximately 175° F. One example of a suitable industrial mixer includes the Model L Top entry mixer that is commercially available from Kady® International. Of course, any number of other mixers capable of achieving the same results are also contemplated.

Once the particle size has been reduced, the batch can rest for approximately 30 minutes before moving to step 4. At this time, the resulting hydrated chia grains will have maintained a moisture ratio of 87.5% water and 12.5% chia grains; the temperature will be maintained at 175° F., the particle size will be at or about 140 microns, and the Centipoise range will be between 1,000 and 2,000 cp in 50% water solution.

At step 4, the hydrated chia grains from step 3 can be run through a positive pump heat exchanger to increase the grain temperature to approximately 180° F., while maintaining the same moisture ratio, size, PH, and centipoise.

At step 5, the hydrated chia grains from step 4 can be pumped to a two stage homogenizer in order to further reduce the grain size and to remove the mucilaginous properties of the chia grains. In the preferred embodiment, once back pressure reaches 50 psi, the two stage homogenizer is started in recycle mode, the air bleed is taken out of the recycle lines, and the pressure is raised to approximately 1,000 psi on the 2nd stage and approximately 6,000 psi on the 1st stage and then two stage is put in forward flow wherein the resulting product is discharged into storage containers and rested for approximately one hour. One example of a suitable homogenizer includes the commercially available Niro Sovai Homogenizer Model NS-3011H. Of course, any number of other devices capable of achieving the same results are also contemplated.

At this time, the resulting hydrated chia grains will have maintained a moisture ratio of 87.5% water and 12.5% chia grains, the temperature will remain at or near 180° F., and the PH range will remain between 6.5 and 7.5. However, the particle size will be reduced to approximately 50-53 microns, the centipoise range will be between 1,000 and 1,5000 cp, based on 50% water content, and the grains will be non-mucilaginous.

At step 6, the hydrated chia grains from step 5 can be dried. In the preferred embodiment, the hydrated grains can be inserted into a commercial roll dryer which can include a positive pump running at 41 Hz, steam pressure at 100 psi and a drum speed at 20 Hz, in order to achieve grain moisture levels between approximately 2% and 3%, and the overall batch moisture to approximately 3.00%. At the conclusion of this process, the batch of product can exit the roll dryer in large sheets and augers or other such devices can break the product into flakes ranging between approximately 1 and 3 inches in diameter. The flakes can then be sealed within 30 gallon fiber drums with plastic liners, and rested for approximately 1-2 hours until reaching ambient temperature typically between 70-78° F.

Roll dryers for grain, seeds and other such material are extremely well known in the art. One suitable example can include the commercially available Dryer Master DM510. Of course, any number of other devices such as a spray dryer, for example, that are capable of achieving the same results are also contemplated.

At this time, the resulting product will include non-mucilaginous dry flakes ranging in size from between 1 and 3 inches in diameter, at ambient temperature, and having a PH range of between 6.5 and 7.5.

At Step 7, the flakes from step 6 can be dry milled to form the reconstitutable and water soluble chia powder product. In the preferred embodiment, the dry mill can include a cone mill with a 2 mm screen wherein the flakes can be broken into free flowing dry grains having an average size of between 80 and 90 microns. At this time, the resulting product can be bagged and shipped for consumption.

At the conclusion of step 7, the reconstitutable and water soluble chia powder product will include non-mucilaginous, non-oily free flowing grains having a size of between approximately 80 and 90 microns, a PH range of between 6.5 and 7.5, 3% average moisture, and a centipoise of between approximately 1,000 and 1,500 cp, with 50% water solution. When the product is mixed with an aqueous carrier such as water, juice or other such beverages, the individual grains can revert to between 50 and 53 microns in size.

Nutrition is maintained within normal standards of deviation. Bioavailability is increased well beyond 85% of whole grain. The final product has a 0 plate count because of pasteurization and micro processing. Product will now blend well in hot or cold liquids and mix well with dry or semi dry products. Product can be used in almost any food, beverage or supplement application, and will not contain a gritty texture.

In addition to the above, other embodiments are also contemplated wherein the grains are micro-encapsulated via carbohydrates, for example, in order to preserve the resulting product, and to improve shelf life and oxidation. As described herein, the encapsulation can be performed utilizing any suitably machinery and methodology as is known in the art.

Although the reconstitutable and water soluble chia powder product is described above as reverting to approximately 50 and 53 microns when hydrated or consumed, this is but one preferred size capable of being achieved by the above described method. However, other embodiments are also contemplated wherein the reconstitutable and water soluble chia powder product can revert to any number of different sizes ranging from sub-micron, to 0.1 micron, to 1000 microns, for example.

In this regard, another embodiment of the above method can further include step 3.5, which can be performed between the above described steps 3 and 4. As such, in step 3.5, the hydrated chia grains from step 3 can be run through a bead mill having a plurality of 2 mm glass beads, for example, which can function to lower the particle size of the grains to anywhere from 0.1 microns to 3 microns, for example. Once reduced to the required size, the hydrated grains can proceed through steps 4-7, as described above. Additionally, step 3.5 can also adjust any number of variables such as time, temperature, shear, pressure, PH, and the like, in order to modify the color and/or taste of the hydrated grains moving into step 4.

As a result, upon the conclusion of step 7, the reconstitutable and water soluble chia powder product can revert to any desirable size (e.g., 0.1 microns to 3 microns) which, are suitable for use in pharmaceuticals and/or intravenous feedings, for example, while maintaining complete grain nutrition.

Although described above as utilizing particular machinery and/or steps in a particular order, this is for illustrative purposes only. To this end, those of skill in the art will recognize that any number of different types of machinery can be utilized, as described above to create the reconstitutable and water soluble chia powder product. Additionally, the above noted steps may also be performed in an order different than that described above. As such, the invention is not to be construed as limiting.

Finally, those of skill in the art will realize that any number of additives can also be combined within the product, the items including but not limited to coffee, tea, herbs, fruits, vegetables, roots, sugars, spices, proteins, carbohydrates, lipids, vitamins minerals, and fiber, for example, in order to augment the taste, consistency and/or health benefits of the final product. One or more of these items can be introduced at any step of the manufacturing process, in accordance with manufacturing techniques.

The process can also be used to produce mixtures of Anutra (all chia types) products that are new molecules as well as combinations of existing molecules including all and any items used in foods, supplements, and pharmaceuticals such as proteins (amino acids plant or animal), vitamins, minerals, lipids, fibers, sugars, carbohydrates, enzymes, bacteria, viruses, fungus, protozoa, prion, etc.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of preparing a reconstitutable and water soluble chia composition, said method comprising:
    providing clean, dry, whole chia grains;
    combining the chia grains with an aqueous carrier to create a mixture;
    heating the mixture to approximately 175° F.;
    agitating the mixture for a first period of time;
    processing the mixture through a rotor/stator workhead to reduce a particle size of the grains within the mixture to approximately 140 microns, and to remove a mucilaginous property of the grains;
    processing the mixture through a bead mill to further reduce the particle size of the grains within the mixture to a first sub-micron size;
    heating the mixture to approximately 180° F.;
    processing the mixture through a two-stage homogenizer to reduce the particle size of the grains within the mixture to a second sub-micron size, said second sub-micron size being smaller than the first sub-micron size;
    drying the mixture to create dry flakes having a moisture level of between approximately 2% and 3%; and
    milling the flakes to create dry grains having a size of approximately 80-90 microns.

2. The method of claim 1, wherein the whole chia grains are produced utilizing no genetically modified organisms.

3. The method of claim 1, wherein the mixture includes a ratio of approximately 87.5% water and 12.5% chia grains.

4. The method of claim 1, further comprising: adjusting a pH of the mixture to approximately 6.5 and 7.5 during the agitation.

5. The method of claim 1, wherein the first period of time is approximately 2 hours and upon completion of the agitation, the chia grains of the mixture include a size of between 2.5 mm and 4 mm.

6. The method of claim 1, wherein the rotor/stator workhead is incorporated into an industrial grade mixer, and operates at 10,000 RPM for 90 minutes.

7. The method of claim 1, wherein the two stage homogenizer is operated at a pressure of approximately 1000 psi on a second stage, and a pressure of approximately 6,000 psi on a first stage.

8. The method of claim 1, wherein the drying is performed via a roll dryer.

9. The method of claim 1, wherein the drying is performed via a spray dryer.

10. The method of claim 1, wherein the milling is performed via a cone mill having a 2 mm screen.

11. The method of claim 1, wherein heating the mixture to approximately 180° F. is performed via a positive pump heat exchanger.

12. The method of claim 1, wherein the dry grains revert to the second sub-micron size when suspended within an aqueous carrier.

13. A reconstitutable and water soluble chia composition produced by the method of claim 1, the composition consisting of:
non-oily free flowing grains having a size of between approximately 80 and 90 microns, a pH of between 6.5 and 7.5, a 3% average moisture content, and a centipoise value of between approximately 1,000 and 1,500 cp; that revert to a sub-micron size when mixed with an aqueous carrier.

14. The method of claim 1, wherein the first sub-micron size is between approximately 0.5 and 0.9 microns, and the second sub-micron size is between approximately 0.1 and 0.5 microns.

15. The method of claim 14, wherein the dry grains revert to between approximately 0.1 and 0.5 microns when suspended within an aqueous carrier.

16. A reconstitutable and water soluble chia composition produced by the method of claim 1, the composition comprising:
dry non-oily free flowing grains having a size of approximately 80-90 microns that revert to a size of between approximately 0.1 and 0.5 microns when mixed with an aqueous carrier.

17. A reconstitutable and water soluble chia composition produced by the method of claim 1, the composition consisting of:
dry non-oily free flowing grains having a size of approximately 80-90 microns that revert to a size of between approximately 0.1 and 0.5 microns when mixed with an aqueous carrier.

* * * * *